C. SCHLUETER.
POTATO DROPPER.
APPLICATION FILED FEB. 27, 1911.

998,405.

Patented July 18, 1911.

Inventor
Carl Schlueter

Witnesses

By Franklin N. Hoyt
Attorney

UNITED STATES PATENT OFFICE.

CARL SCHLUETER, OF GRESHAM, NEBRASKA.

POTATO-DROPPER.

998,405.

Specification of Letters Patent.   Patented July 18, 1911.

Application filed February 27, 1911.   Serial No. 611,143.

*To all whom it may concern:*

Be it known that I, CARL SCHLUETER, a citizen of the United States, residing at Gresham, in the county of York and State of Nebraska, have invented certain new and useful Improvements in Potato-Droppers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in potato planters and the object in view is to produce a simple and efficient apparatus of this nature so arranged that the potatoes may be picked up in cups fixed to the circumference of a rotary cylinder, the distance between each hill being determined by the positions of the cups upon the cylinder.

My invention comprises various other details of construction and combinations and arrangements of parts which will be hereinafter fully described and then specifically defined in the appended claim.

I illustrate my invention in the accompanying drawings, in which:—

Figure 1:
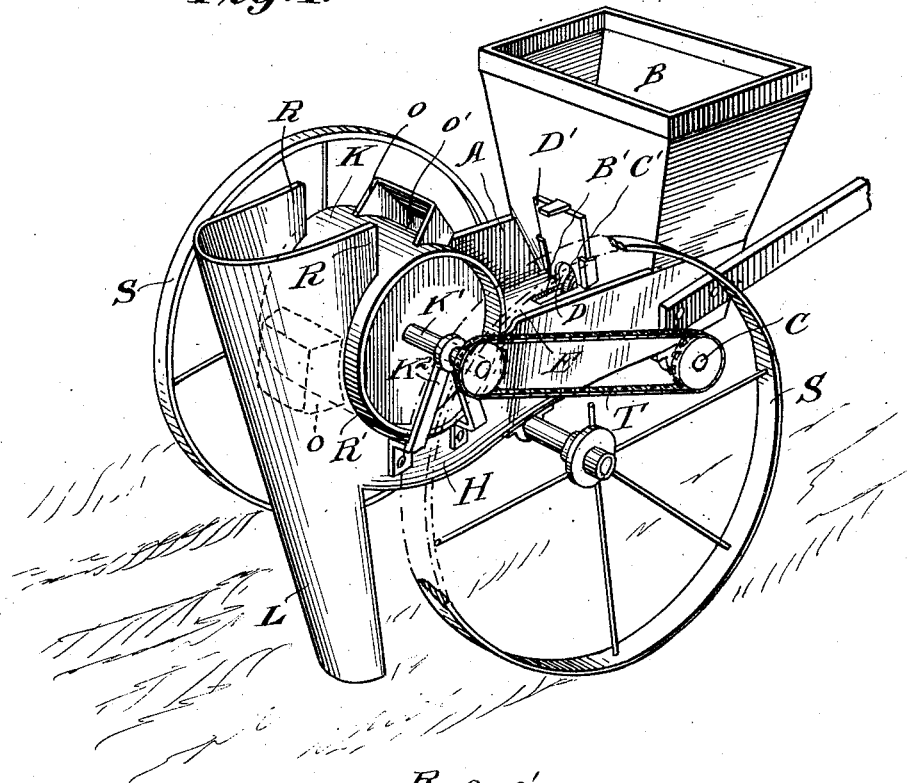
Figure 2:
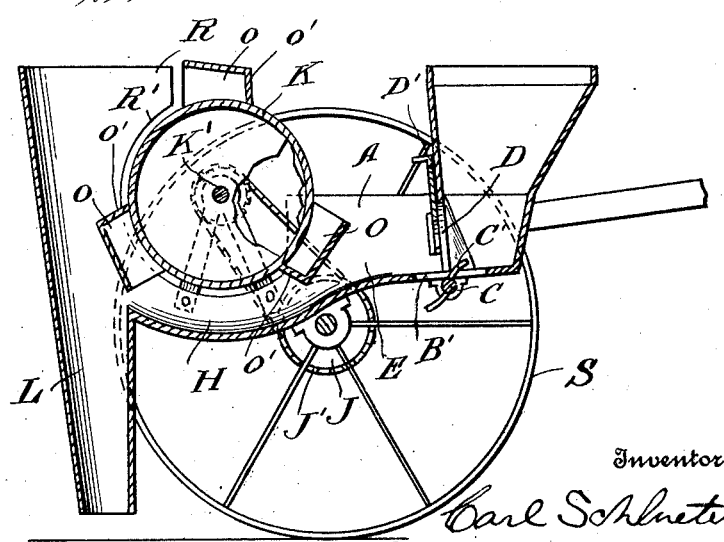

Figure 1 is a perspective view of my improved potato planting apparatus, and Fig. 2 is a vertical central sectional view through a part of the apparatus.

Reference now being had to the details of the drawings by letter, A designates a frame supporting the hopper B in which the potatoes to be planted are placed. A shaft C is journaled in suitable bearings underneath the hopper and has stirrer fingers C' projecting therefrom and adapted to turn through a slot B' formed in the bottom of the hopper. An exit opening D in one side of the hopper is regulated by a slide D' and serves as means for allowing the potatoes to be fed rearward into the trough shaped portion E, which latter has a concaved recessed part H in which the cylinder K rotates, the latter having a shaft K' journaled in the bracket arms K². Said cylinder has a series of cups fastened to its circumference, each designated by letter O, and the bottom O' of each cup is inclined, so that it may deflect a potato being deposited by the following cup into the spout L which is adapted to direct the potato to the hill or other place where it is to be dropped. The walls of said spout flare as at R forming wings and each has a concaved edge R' adjacent to the cylinder, and which wings serve as means for causing the potatoes to fall into the spout L.

Fixed to the shaft which is journaled underneath the hopper is a sprocket wheel J about which a chain J' passes and also about a second sprocket wheel mounted upon the shaft K' upon which the cylinder is mounted. The shaft C is driven by sprocket wheel connection T with the driving wheel S of the truck on which the apparatus is mounted.

The operation of my invention will be readily understood and is as follows:—The potatoes being placed in the hopper are fed singly or several together as may be desired through the exit opening in the hopper and, falling by gravity into the recess underneath the cylinder, will be caught up by the cups upon the circumference of the latter as the same is rotated and elevated and dumped into the spout and allowed to drop at intervals determined by the distance of the cups apart upon the circumference of the cylinder.

What I claim to be new is:—

A potato dropping apparatus consisting of a frame having a hopper at one end and a spout at its opposite end, a rotary cylinder mounted upon said frame and having circumferential cups thereon, said spout having concaved recesses in the opposite edges thereof and in which said cylinder is adapted to turn, said cups adapted to turn between the wall of the spout which serves to guide the potatoes as they fall from the cups, and means for rotating said cylinder.

In testimony whereof I hereunto affix my signature in the presence of two witnesses.

CARL SCHLUETER.

Witnesses:
 J. E. HART,
 JOHN SCHLOUDORF.

Copies of this patent may be obtained for five cents each, by addressing the " Commissioner of Patents, Washington, D. C."